Figure 1:
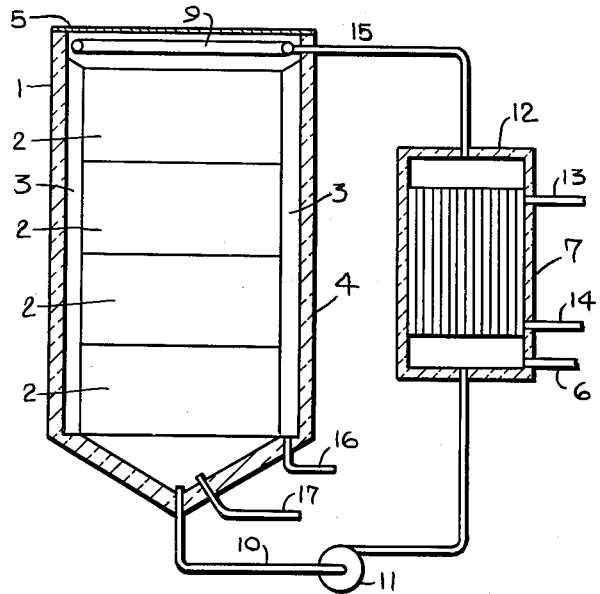

INVENTORS
JOHN ELIAN &
MARCEL LE PINGLE

BY

ATTORNEY

United States Patent Office 2,734,836
Patented Feb. 14, 1956

2,734,836

PRODUCTION OF PENTOSES FROM CELLULOSIC MATERIALS

John Elian, Uccle-Brussels, and Marcel Le Pingle, Schaerbeek-Brussels, Belgium

Application September 12, 1951, Serial No. 246,251

3 Claims. (Cl. 127—37)

The invention relates to the treatment of cellulosic materials.

Cellulosic materials, such as wood, straw, begasse and the like, consist of cellulose fibers mainly bonded together by lignin and pentosans.

When these cellulosic materials are heated in the presence of mineral acids, the pentosans are converted into furfural. This conversion may be intensified by high pressure of, for instance, 5–6 atms.

In conformity with another known method, the cellulosic materials are immersed in hot water at a high temperature and pressure with or without the admixture of an acid. In this manner, juices containing pentoses in aqueous solution are obtained and cellulosic fibers. The method involves the use of high pressure and therefore the application of a costly equipment requiring constant supervision. The juices and the fibers thus obtained are colored and soiled by secondary products formed at the high reaction temperature. Consequently, the separation of the pentoses and the bleaching of the fibers is rendered extremely difficult.

It is the primary object of the invention to eliminate the above described shortcomings of the art.

The invention is based on the surprising recognition that the above referred to vegetable substances undergo an energetic transformation when subjected, in a closed vessel and at a temperature of less than 120° C. and above 80° C. or preferably above 100° C., to the action of a diluted acid and that this action is furthered by the admixture of certain wetting agents, such as the fatty sulfonates.

In this manner, the pentosans are transformed into pentoses, which remain adsorbed in the mass of the charged materials; they can be easily extracted from the same by hot water, whereby a juice or solution results containing the pentoses.

The recovery of the pentoses from the thus obtained solution may be effected after neutralization of the initial acid used for the treatment as well as of the acetic acid formed during the same; lime may be used as a neutralizing agent. The solution of the pentoses is evaporated until dry and the pentoses are extracted by an appropriate solvent, for example diluted ethyl alcohol. The pentoses are separated from this solution by vacuum evaporation and the solvent is thus recovered.

The extraction of the pentoses after neutralization may also be directly effected by the above mentioned solvent.

If furfural is to be produced, a small quantity of a mineral acid, for instance sulfuric acid, is added to the juice resulting from the extraction; the juice is then directly distilled. After neutralization of the distillate, the furfural is purified in accordance with known methods.

For the preliminary treatment of the raw materials, any diluted acid having a pH of 2 to 4 can be used; an acid of a pH of 2 to 3 best serves the purpose and amongst these acetic acid may preferably be used, which is also formed during the process.

The neutralized acid present in the juice may be recovered from the formed acetate by treating the latter with a stronger acid, for instance sulfuric acid. In this manner, the initially used acid and the acid which is formed during the reaction may be recovered. In addition thereto, the advantage is gained of avoiding the primary attack of the cellulosic fibers by the ordinarily used strong acids. The extracted cellulosic fibers can be easily transformed into a cellulosic pulp having a high percentage of cellulose.

The advantage of the present method resides therein that the quantity of water required for the formation and the extraction of the pentoses from the raw materials is small and that an installation can be used, where a limited quantity of acid solution is used in a closed circuit, until a complete conversion of the pentosanes into pentoses is effected.

The raw cellulosic materials are preferably comminuted prior to the start of the treatment, while preserving the structure of the fibers; they are hereupon placed in a cooker, where they are sprinkled at a temperature of between 80 to less than 120° C. with the diluted aqueous acid in a continuous circuit; the latter, is passed through the raw material preferably contained in perforated baskets and is collected in the lower part of the cooker. From here it is passed in a heater, hereupon conducted into the upper part of the cooker provided with a tubular ring which assures a satisfactory distribution of the acid treating agent.

The liquids collected in the lower part of the cooker are thus gradually enriched in pentoses and the concentration of pentoses is only limited by the solution becoming too sticky to be handled or by the formation of deposits on the walls of the treating vessel.

The minimum amount of acidified water is controlled by the fact that the substances absorb a certain quantity of the solution and that there must be a reserve of unused liquid capable of assuring a dilution of the pentoses containing liquid, whereby the above mentioned drawbacks are eliminated. The quantity of liquid used depends upon the quality of the raw materials, their physical conditions, such as moisture content, size of comminution and on the equipment employed. The quantity of solution used may preferably vary between about 1500 and 3000 cm.$^3$ per kg. of raw materials and the quantity of acid, such as acetic acid may vary from 10 to 10 cm.$^3$ per litre, a fraction of the added acid being neutralized by the basic products contained in the raw materials.

At the end of this operation, the pentosans are completely transformed into soluble sugars; however, a portion remains adsorbed in the fibrous pulp.

To recover the latter, the cellulose pulp is transported into another apparatus, through which the juices derived from the primary extraction, are continuously conducted and evaporated, the vapors are condensed and the condensate is used to carry out the extraction, whereas the solution collected in the evaporator grows richer in pentoses.

The solution, wherein the pentoses accumulate, is discharged from the evaporator either at the end of each operation or continuously. The concentration of the juice is higher than obtained by any other known method. The separation of the pentoses and consequently the preparation of the furfurals is thus facilitated and accordingly, the heat required for the evaporation of the water and the dimensions of the used equipment is reduced.

A preferred embodiment of the performance of the invention will now be described with reference to the attached drawing.

Figure 2:
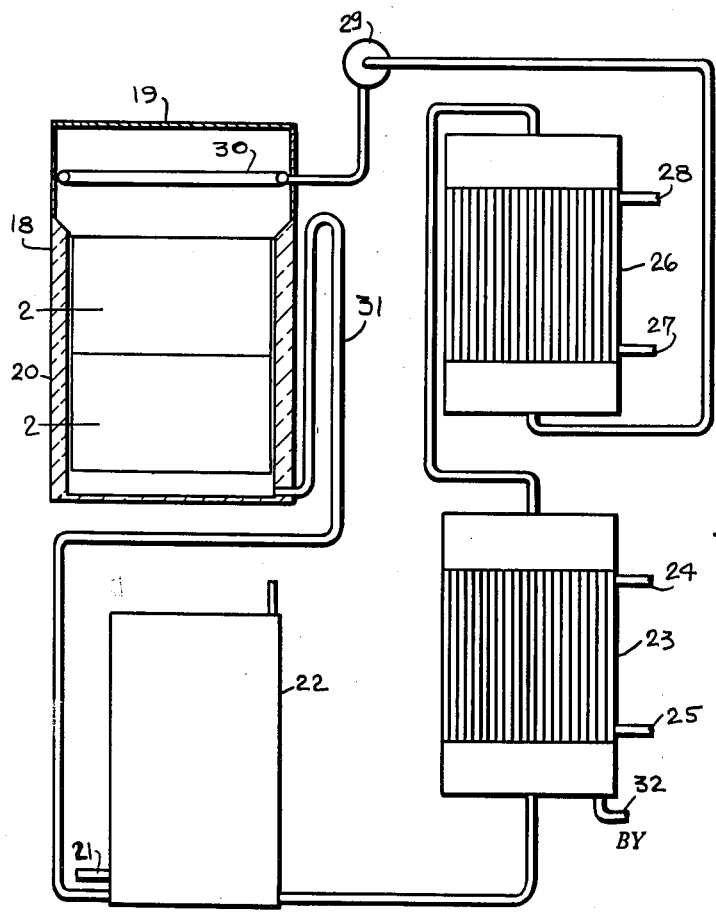

In the drawing, Figs. 1 and 2 show a diagrammatic view of the equipment used for the primary extraction and for the after-treatment of the extracted materials.

This equipment, Fig. 1, comprises a cylindrical extractor or cooker 1, of which the perforation is not shown; perforated baskets 2 containing the raw cellulosic materials are placed in this cooker. The cooker is surrounded by an annular space 3 through which a heating medium is circulated, the latter being entered through pipe 15 and discharged through pipe 16.

The apparatus is completely encased by an insulating layer 4. The baskets containing the cellulosic materials are placed in the cooker through an upper opening closed by one or more covers 5. The above referred to diluted acid containing a moistening agent is entered into the apparatus through tube 6 attached to the heater 7. The acid treating solution is conducted into the circular tube 9 which is provided with customary spray openings in such a manner that the solution is sprayed and sprinkled onto the charge. After having passed through the charge contained in the superimposed baskets the solution, which has now been enriched with pentoses, accumulates in the lower part of the cooker, from where it is carried through pipe 10 and again delivered by the pump 11 into the heater 7 and into the cooker; in this manner, a circuit treatment is effected.

The end of the operation is indicated by an analysis of samples of the produced solution. Hereupon, the final solution is discharged through pipe 17. The cover 5 is opened and the baskets containing the residues of the cellulosic materials are removed.

The heating medium supplied to the preheater is introduced through pipe 13 and discharged through pipe 14. The preheater is insulated by an outside layer 12.

The baskets removed from the cooker are then placed into the apparatus shown in Fig. 2.

Numeral 18 indicates the outer body of the extractor, 2 the baskets, 19 the cover, 20 an insulating layer.

The solution produced in the apparatus of Fig. 1 is introduced through pipe 21 into an intermediary vessel 22; from here it passes into the evaporator 23 supplied with steam from pipe 24 and discharged through pipe 25.

The vapors emanating from the solution are introduced into the condenser 26, into which cold water enters through pipe 27. This water is discharged through pipe 28. The condensed liquid is transported by pump 29 into the ring 30 provided with spray openings. The extractor 18 is gradually filled up, whereas the extraction liquid takes up the soluble materials contained in the fiber residues; once the upper level in the siphon 31 is exceeded, it is emptied into container 22. The pentoses enriched solution, which accumulates in the lower part of the evaporator 23 is finally discharged through pipe 32.

At the end of the operation the circulation is stopped, the cover 3 is opened and the baskets 2 are removed.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what we claim as new and desire to be secured by Letters Patent, is as follows:

1. In a method of making pentoses by the treatment of pentosan-containing cellulosic materials with an organic acid, the steps of charging the said materials into a closed extraction vessel, continuously extracting the same with acetic acid having a pH between 2 and 4 at a temperature between 80 and 100° C. the extraction liquid being conducted through said vessel in a closed cycle, producing thereby a pentose-containing solution, neutralizing and evaporating said solution and recovering the pentoses by extraction of the residual product.

2. In a method of making pentose by treating pentosan-containing cellulosic materials with an acid, the steps of charging the said materials into a closed extraction vessel, continuously extracting the same with acetic acid having a pH between 2 and 4 at a temperature between 80 and 120° C. the extraction liquid being conducted through said vessel in a closed cycle, producing thereby a pentose-containing solution, neutralizing and evaporating said solution, recovering the pentose by extraction of the residual product, transferring the treated cellulosic materials into a second closed extraction vessel, continuously extracting the said materials with a portion of the pentosan-containing solution from the final extraction vessel, producing thereby a pentose-containing solution, neutralizing and evaporating said solution and recovering the pentoses by extraction of the residual product.

3. The method of claim 1 wherein the acetic acid is sprayed on the cellulosic material.

References Cited in the file of this patent

UNITED STATES PATENTS

| | | |
|---|---|---|
| 985,725 | Cohoe | Feb. 28, 1911 |
| 1,190,953 | Renshaw | July 11, 1916 |
| 1,816,136 | Acree | July 28, 1931 |
| 1,851,822 | Farber | Mar. 29, 1932 |
| 1,906,429 | Stegemeyer | May 2, 1933 |
| 1,936,190 | Dreyfus | Nov. 21, 1933 |
| 1,969,600 | Farber | Aug. 7, 1934 |
| 2,284,500 | Warth | May 26, 1942 |

FOREIGN PATENTS

| | | |
|---|---|---|
| 481,082 | Great Britain | Mar. 4, 1938 |
| 541,048 | France | Apr. 26, 1922 |

OTHER REFERENCES

Dunning et al.: Ind. and Eng. Chem., Jan. 1945, pgs. 24 to 29 (pg. 25, col. 1, pertinent).

Mackenzie: Sugars and Their Simple Derivatives, London 1913, pgs. 151 to 153.